US011581529B2

(12) United States Patent
Scoyer et al.

(10) Patent No.: US 11,581,529 B2
(45) Date of Patent: Feb. 14, 2023

(54) SUBMICRON SIZED SILICON POWDER WITH LOW OXYGEN CONTENT

(71) Applicant: Umicore, Brussels (BE)

(72) Inventors: Jean Scoyer, Herentals (BE); Stijn Put, Olmen (BE); Daniël Nelis, Peer (BE); Kris Driesen, Hasselt (BE)

(73) Assignee: Umicore, Brussels (BE)

( * ) Notice: Subject to any disclaimer, the term of this patent is extended or adjusted under 35 U.S.C. 154(b) by 335 days.

(21) Appl. No.: 16/868,149

(22) Filed: May 6, 2020

(65) Prior Publication Data
US 2020/0266429 A1 Aug. 20, 2020

Related U.S. Application Data

(63) Continuation of application No. 16/211,641, filed on Dec. 6, 2018, now abandoned, which is a continuation (Continued)

(30) Foreign Application Priority Data

Dec. 15, 2010 (EP) .................................... 10015662

(51) Int. Cl.
H01M 4/38 (2006.01)
H01M 4/36 (2006.01)
(Continued)

(52) U.S. Cl.
CPC ............. *H01M 4/366* (2013.01); *C01B 33/00* (2013.01); *C01B 33/02* (2013.01); *C01B 33/027* (2013.01);
(Continued)

(58) Field of Classification Search
CPC ........ H01M 4/366; H01M 4/134; H01M 4/38; H01M 4/386; H01M 4/483; H01M 4/628;
(Continued)

(56) References Cited

U.S. PATENT DOCUMENTS 4,217,334 A 8/1980 Weigert et al.
4,868,013 A 9/1989 Allen
(Continued)

FOREIGN PATENT DOCUMENTS

DE 102007061618 A1 6/2009
EP 1978072 A1 10/2008
(Continued)

OTHER PUBLICATIONS

Cui et al., "Crystalline-Amorphous Core-Shell Silicon Nanowire for High Capacity and High Current Battery Electrodes," Nano Letters, vol. 9, No. 1, Dec. 23, 2008, pp. 491-495.
(Continued)

*Primary Examiner* — Cynthia K Walls
(74) *Attorney, Agent, or Firm* — NK Patent Law

(57) ABSTRACT

A submicron sized Si based powder having an average primary particle size between 20 nm and 200 nm, wherein the powder has a surface layer comprising $SiO_x$, with $0<x<2$, the surface layer having an average thickness between 0.5 nm and 10 nm, and wherein the powder has a total oxygen content equal or less than 3% by weight at room temperature. The method for making the powder comprises a step where a Si precursor is vaporized in a gas stream at high temperature, after which the gas stream is quenched to obtain Si particles, and the Si particles are quenched at low temperature in an oxygen containing gas.

15 Claims, 2 Drawing Sheets

Related U.S. Application Data of application No. 13/699,004, filed as application No. PCT/EP2011/060412 on Jun. 22, 2011, now Pat. No. 10,181,600.

(60) Provisional application No. 61/359,485, filed on Jun. 29, 2010.

(51) Int. Cl.

| | | |
|---|---|---|
| *C01B 33/113* | (2006.01) | |
| *C01B 33/00* | (2006.01) | |
| *C01B 33/02* | (2006.01) | |
| *C01B 33/027* | (2006.01) | |
| *C01B 33/029* | (2006.01) | |
| *C01B 33/03* | (2006.01) | |
| *H01M 4/48* | (2010.01) | |
| *H01M 4/134* | (2010.01) | |
| *H01M 4/62* | (2006.01) | |
| *H01M 10/0525* | (2010.01) | |
| *H01M 4/02* | (2006.01) | |

(52) U.S. Cl.
CPC ............ *C01B 33/029* (2013.01); *C01B 33/03* (2013.01); *C01B 33/113* (2013.01); *H01M 4/134* (2013.01); *H01M 4/38* (2013.01); *H01M 4/386* (2013.01); *H01M 4/483* (2013.01); *H01M 4/628* (2013.01); *H01M 10/0525* (2013.01); *C01P 2004/62* (2013.01); *C01P 2004/64* (2013.01); *C01P 2006/40* (2013.01); *H01M 2004/027* (2013.01); *H01M 2220/30* (2013.01)

(58) Field of Classification Search
CPC ....... H01M 10/0525; H01M 2004/027; H01M 2220/30; H01M 4/58; C01B 33/00; C01B 33/02; C01B 33/027; C01B 33/029; C01B 33/03; C01B 33/113; C01P 2004/62; C01P 2004/64; C01P 2006/40; Y02E 60/10
See application file for complete search history.

(56) References Cited

U.S. PATENT DOCUMENTS

| | | |
|---|---|---|
| 2003/0157407 A1 | 8/2003 | Kosuzu et al. |
| 2006/0237697 A1 | 10/2006 | Kosuzu et al. |
| 2009/0236563 A1 | 9/2009 | Goan et al. |
| 2011/0020241 A1 | 1/2011 | Tsukada et al. |
| 2015/0280223 A1 | 10/2015 | Chang et al. |

FOREIGN PATENT DOCUMENTS

| | | |
|---|---|---|
| JP | 2004331480 A | 11/2004 |
| WO | 2008064741 A1 | 6/2008 |
| WO | 2009050639 A1 | 4/2009 |
| WO | 2007086267 A1 | 6/2009 |
| WO | 2009114026 A1 | 9/2009 |
| WO | 2009151489 A2 | 12/2009 |
| WO | 2010123875 A1 | 10/2010 |
| WO | 2010016289 A1 | 1/2012 |

OTHER PUBLICATIONS

International Preliminary Report on Patentability for International Patent Application No. PCT/EP2011/060412, dated Oct. 26, 2012, 13 pages.
ISA/EP; International Search Report and Written Opinion for International Application No. PCT/EP2011/060412, dated Sep. 6, 2011, 12 pages.
USPTO; Restriction Requirement for U.S. Appl. No. 13/699,004 dated Oct. 20, 2014, 9 pages.
USPTO; Non-Final Office Action for U.S. Appl. No. 13/699,004 dated Jan. 5, 2018, 7 pages.
USPTO; Non-Final Office Action for U.S. Appl. No. 13/699,004 dated Nov. 2, 2016, 9 pages.
USPTO; Non-Final Office Action for U.S. Appl. No. 13/699,004 dated Jan. 16, 2015, 10 pages.
USPTO; Final Office Action for U.S. Appl. No. 13/699,004 dated May 31, 2018, 8 pages.
USPTO; Final Office Action for U.S. Appl. No. 13/699,004 dated Aug. 29, 2017, 16 pages.
USPTO; Final Office Action for U.S. Appl. No. 13/699,004 dated Jul. 8, 2015, 10 pages.
USPTO; Non-Final Office Action for U.S. Appl. No. 16/211,641 dated May 6, 2020, 7 pages.

SUBMICRON SIZED SILICON POWDER WITH LOW OXYGEN CONTENT

CROSS-REFERENCE TO RELATED APPLICATIONS

This application is a continuation of U.S. patent application Ser. No. 16/211,641, filed on Dec. 6, 2018, which is a continuation of U.S. patent application Ser. No. 13/699,004, filed on Jan. 3, 2013, now U.S. Pat. No. 10,181,600, issued on Jan. 15, 2019, which is a U.S. National Stage Patent Application of International Patent Application No. PCT/EP2011/060412, filed on Jun. 22, 2011, which claims the benefit of U.S. Provisional Patent Application No. 61/359,485, filed on Jun. 29, 2010. This application also claims priority under 35 U.S.C. § 119 to European Patent Application No. 10015662.9, filed Dec. 15, 2010.

TECHNICAL FIELD AND BACKGROUND

This invention relates to submicron sized silicon based powders having low oxygen content and the synthesis of this powder using a gas phase technology.

Silicon powders are currently developed and used in a wide variety of applications including lithium-ion batteries, printed electronics and solar applications. These applications require ultrafine powders with low oxygen content.

Lithium-ion batteries are the most widely used secondary systems for portable electronic devices. Compared to aqueous rechargeable cells, such as nickel-cadmium and nickel metal hydride, Li-ion cells have higher energy density, higher operating voltages, lower self discharge and low maintenance requirements. These properties have made Li-ion cells the highest performing available secondary battery.

The worldwide energy demand increase has driven the lithium-ion battery community to search for new generation electrode materials with high energy density. One of the approaches is to replace the conventional carbon graphite negative electrode material by another better performing active material, being a metal, metalloid or metallic alloy based on silicon (Si), tin (Sn) or aluminum (Al). These materials can provide much higher specific and volumetric capacity compared to graphite. On top of the specific composition of the negative electrode material, the surface properties of the particles are playing a key role in the electrochemical behaviour of the resulting Li-ion battery. Therefore, it is of paramount importance to be able to optimize those parameters in order to enhance the electrochemical performances of the negative electrode.

The composite electrode needs to posses mixed conductivity with both ionic lithium and electrons. Such a complex medium is generally obtained by mixing together the active material particles with different additives such as a very fine powder of carbon black and a polymeric binder. The binder additive has a complex role since it not only gives mechanical strength to the composite electrode but also allows for a good adhesion between the electrode layer and the current collector, and it gives the composite electrode a sufficient liquid electrolyte uptake to provide internal ionic percolation.

As mentioned Si-based negative electrode materials could significantly enhance the energy density of the commercial lithium ion batteries. Silicon has the largest theoretical gravimetric capacity (3579 mAh/g) corresponding to the following reaction: $15Li+4Si \rightarrow Li_{15}Si_4$ and a large volumetric capacity (2200 mAh/cm$^3$). However, the microscopic structure of these materials and their huge volume expansion upon lithium intercalation had never allowed reaching acceptable life characteristics for their use in rechargeable cells. The synthesis of materials at the submicron scale allows to overcome the main drawbacks of these materials and makes them suitable candidates for the replacement of carbon. An interesting method to prepare submicron powders is plasma technology, as is disclosed in WO 2008/064741 A1.

Unfortunately, these submicron silicon powders rapidly oxidize when exposed to air. This uncontrolled oxidation of submicron sized silicon powder finally results in oxygen contents above 10 wt %. This high oxygen level will have a negative impact on the electrochemical behaviour of these Si based powders in Li-ion batteries, generating high capacity losses during first cycling (the so called irreversible capacity) because of the reduction of this layer.

It is an aim of the present invention to improve or even overcome these problems, and to provide for better negative electrode materials that can be manufactured by a simple and economical process.

SUMMARY

Viewed from a first aspect, the invention can provide a submicron sized Si based powder having an average primary particle size between 20 nm and 200 nm, wherein the powder has a surface layer comprising $SiO_x$, with $0<x<2$, the surface layer having an average thickness between 0.5 nm and 10 nm, and wherein the powder has a total oxygen content equal or less than 3% by weight at room temperature. The surface layer may also consist only of $SiO_x$, with $0<x<2$. In one embodiment the surface layer is thinner than 5 nm, in order to avoid large irreversible capacities during first cycling and, in another embodiment it is thicker than 0.5 nm in order to have a stable passivated powder that will not further oxidize when exposed to air or oxidizing gases. The thickness of the oxidized layer is herein expressed as the average thickness of the Layer measured on transmission electron microscopy (TEM) pictures. The Si based powder may consist of pure Si. The Si based powder may also be nanosized, i.e. with an average primary particle size between 20 nm and 200 nm.

In one embodiment the submicron sized Si based powder has an oxidized surface layer comprising $SiO_x$, with $1 \leq x < 2$. In another embodiment the powder has a purity of at least 98 at % Si. The Si based powder may also consist of pure Si. In another embodiment the submicron sized Si based powder has a total oxygen content less than 4% by weight after being aged for 1 hour at 500° C. under atmospheric conditions and in air. In yet another embodiment the submicron sized Si based powder has a total oxygen content less than 5% by weight after being aged for 1 hour at 700° C. under atmospheric conditions and in air. These conditions guarantee that the passivation layer of the Si based powder is stable and further oxidation will not take place.

The submicron sized Si based powder described above can further comprise an element M selected from the group consisting of transition metals, metalloids, Group IIIa elements and carbon. In one embodiment M comprises either one of more elements of the group consisting of nickel, copper, iron, tin, aluminium and cobalt.

Viewed from a second aspect, the invention can provide the use of the submicron sized Si based powder as a negative electrode material in a Li-ion secondary battery.

Viewed from a third aspect, the invention can provide a method for manufacturing the Si based powder described above, comprising the steps of:

providing a Si based precursor, providing a gas stream at a temperature of at least 1727° C. (equivalent to 2000K), injecting the Si based precursor in the gas stream, thereby vaporizing the Si precursor, quenching the gas stream carrying the vaporized Si precursor to a temperature below 1327° C. (equivalent to 1600K), thereby obtaining submicron sized Si particles, passivating the submicron sized Si particles in an oxygen containing gas at a temperature below 700° C., and preferably below 450° C. and separating the Si particles from the gas stream.

Such a process yields a submicron sized Si based powder with a surface layer comprising a mixture of Si sub-oxides ($SiO_x$, with x<2) by the controlled passivating step, combined with the other process steps.

In one embodiment the passivation step is performed at a temperature between room temperature and 100° C. In another embodiment, the gas stream is provided by means of either one of a gas burner, a hydrogen burner, an RF plasma or a DC arc plasma. In yet another embodiment, the passivation step is performed in an oxygen containing gas further comprising a secondary gas consisting of either one or more of the group consisting of Ar, $N_2$, $H_2$, CO and $CO_2$. In yet another embodiment, the oxygen containing gas is a mixture of oxygen and nitrogen, with less than 1% oxygen by weight. In a further embodiment, the passivation step can be carried out for a period of less than 60 minutes, and preferably less than 10 minutes. In another further embodiment, the gas stream is provided in a radio frequency inductively coupled plasma, and the gas stream comprises argon gas.

DETAILED DESCRIPTION

Submicron sized silicon based powder with a controlled oxygen level at the surface can, when used as a negative electrode material in a lithium ion secondary battery, limit the first irreversible capacity of this negative electrode whilst maintaining a high reversible capacity, due to the powder's small particle size and its corresponding large surface area, combined with a low oxygen content. The powder can consist of silicon particles covered with a very thin homogeneous layer of oxidized material, the particles having a total oxygen content less than 3 wt % at room temperature.

In one embodiment the silicon submicron powder has an average primary particle size of between 20 nm and 200 nm, where the average primary particle size ($d_{av}$) is calculated from the specific surface area, assuming spherical particles of equal size, according to the following formula:

$$d_{av} = \frac{6}{\rho \times BET},$$

in which ρ refers to the theoretical density of the powder (2.33 g/cm³) and BET refers to the specific surface area (m²/g) as determined by the $N_2$ adsorption method of Brunauer-Emmett-Telfer (BET technique).

The present invention can also provide a method for producing this Si based powder whereby a Si based precursor is provided, a gas stream at a temperature of at least 1727° C. is provided, the Si based precursor is injected in the gas stream, whereby the Si precursor is vaporized, the gas stream is cooled at a temperature below 1327° C., whereby submicron sized Si particles are obtained that are finally passivated in an oxidizing gas at a temperature below 700° C. The gas stream can be provided by a radio frequency inductively coupled plasma, and the gas stream can comprise argon gas.

The invention may be practiced, for example, by way of the different examples described below.

Example 1

A micron-sized Si powder is provided as Si precursor. A 60 kW radio frequency (RF) inductively coupled plasma (ICP) is applied, using an argon plasma with 2.5 Nm³/h argon gas. The solid silicon precursor is injected in the plasma at a rate of 220 g/h, resulting in a prevalent (i.e. in the reaction zone) temperature above 2000 K. In this first process step the Si precursor is totally vaporized followed by a nucleation into submicron sized Si powder. An argon flow of 10 Nm³/h is used as quench gas immediately downstream of the reaction zone in order to lower the temperature of the gas below 1600 K. In this way the metal nuclei will be formed. Finally, a passivation step is performed at a temperature of 100° C. during 5 minutes by adding 100 L/h of a $N_2/O_2$ mixture containing 0.15 mole % oxygen.

Figure 1:
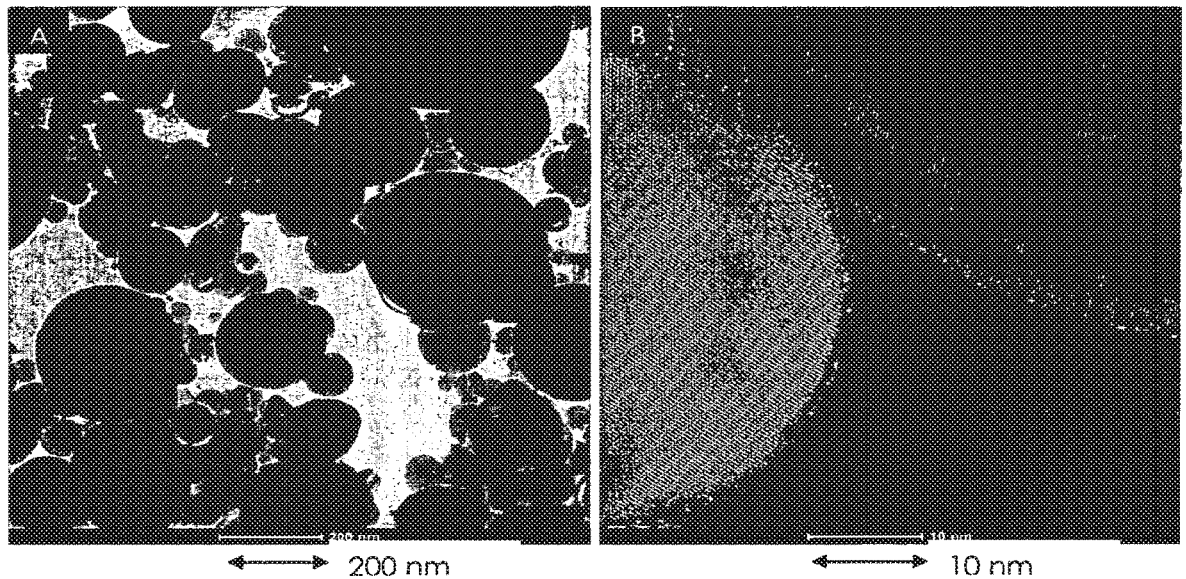
FIG. 1: TEM images (low magnification (A) en high magnification (B)) showing the presence of a thin amorphous $SiO_x$ layer at the surface of Si submicron particles.

The submicron sized Si powder has a cubic crystalline phase and a specific surface area of 40±2 m²/g (as measured by the BET technique), which corresponds to a mean primary particle size of about 60 nm. Chemical analysis shows that the oxygen content is 2.8 wt %, whilst TEM characterization shows the presence of a thin amorphous $SiO_x$ surface layer with a thickness of 1-2 nm, as is shown in FIG. 1.

A paste is prepared by adding the obtained silicon powder to a 2% Na-CMC water-based solution. Subsequently acetylene black is added. The final paste, having a silicon/CMC/acetylene black ratio of 50/25/25, is finally ball milled for 30 minutes. Coatings with a thickness between 20 and 30 μm are deposited on a copper foil by doctor blade coating. The first drying of the paste was done using a conventional hot-air furnace but can also be done at room temperature or using a vacuum oven, a conveyer furnace, drying on a heated surface, drying with infra-red irradiation, drying with far infrared irradiation, drying with induction system, coating on a heated electrode, drying in a inert atmosphere. The drying method, temperature and sequence influence the stability of the paste, the internal stress and possible cracking in the dried electrode. Finally coin cell type batteries are prepared in a glove box using Li-foil as counter electrode. Battery tests are performed on the electrodes with the following conditions: cycling between 0.01 and 1.0 V at a rate of C/20, where C is defined as charging/discharging, at a rate of 3572 mAh/g per hour.

Table 1 gives an overview of the capacity of the 1$^{st}$ delithiation step. The value in the Table is an average for 3 coin cells. A capacity of 3700 mAh/g silicon is measured, and a very low irreversible capacity of less than 8% is obtained after the first cycle (Table 1 & FIG. 2).

Counter Example CE 2

A silicon powder is produced in the 60 kW radio frequency (RF) inductively coupled plasma (ICP) as described in Example 1. After quenching however a modified passivation step is applied at a temperature of 500° C. during 5 minutes, by adding 150 L/h of a $N_2/O_2$ mixture containing 0.15 mole % oxygen.

The powder has a cubic crystalline phase and a specific surface area of 40±2 $m^2/g$ (as measured by the BET technique), which corresponds to a mean primary particle size of about 60 nm. Chemical analysis shows that the oxygen content is 6.8 wt %, whilst TEM characterization shows the presence of a thin amorphous $SiO_x$ surface layer with a thickness of 2-5 nm.

A paste is prepared and coin cells are made and tested as described in Example 1. A delithiation capacity of 3500 mAh/g silicon is measured, and a irreversible capacity of 573 mAh/g (14%) is obtained after the first cycle (see Table 1), which is considered too high.

Counter Examples CE 3-4

Two commercially available silicon samples were purchased, and oxygen contents of respectively 19.3 wt % (Counter example 3 obtained from Kaier, CN, with a BET value of 20 $m^2/g$ and an estimated average primary particle size of 130 nm) and 25 wt % (Counter Example 4 obtained from Aldrich, US, with a BET value of 34 $m^2/g$ and an estimated average primary particle size of 75 nm). The average thickness of the surface layer of Counter Example 3 is 15 nm (surface layer thickness and oxygen content are related to each other). A paste is prepared and coin cells are made and tested as described in Example 1. This results in low delithiation capacities of respectively 2800 and 1500 mAh/g silicon (see Table 1). Furthermore, high irreversible capacity values of 600 mAh/g (17%)(CExample 3) and 644 mAh/g (30%)(CExample 4) are obtained after the first cycle, which is higher than for Example 1.

TABLE 1

Overview of coin cell testing results

| Example number | Oxygen content (wt %) | Delithiation capacity first cycle (mAh/g) | First irreversible capacity (mAh/g) | First irreversible capacity (%) |
|---|---|---|---|---|
| 1 | 2.8 | 3700 | 305 | 7.6 |
| CE 2 | 6.8 | 3500 | 573 | 14.1 |
| CE 3 | 19.3 | 2800 | 600 | 17.6 |
| CE 4 | 25.0 | 1500 | 644 | 30.0 |

Figure 2:
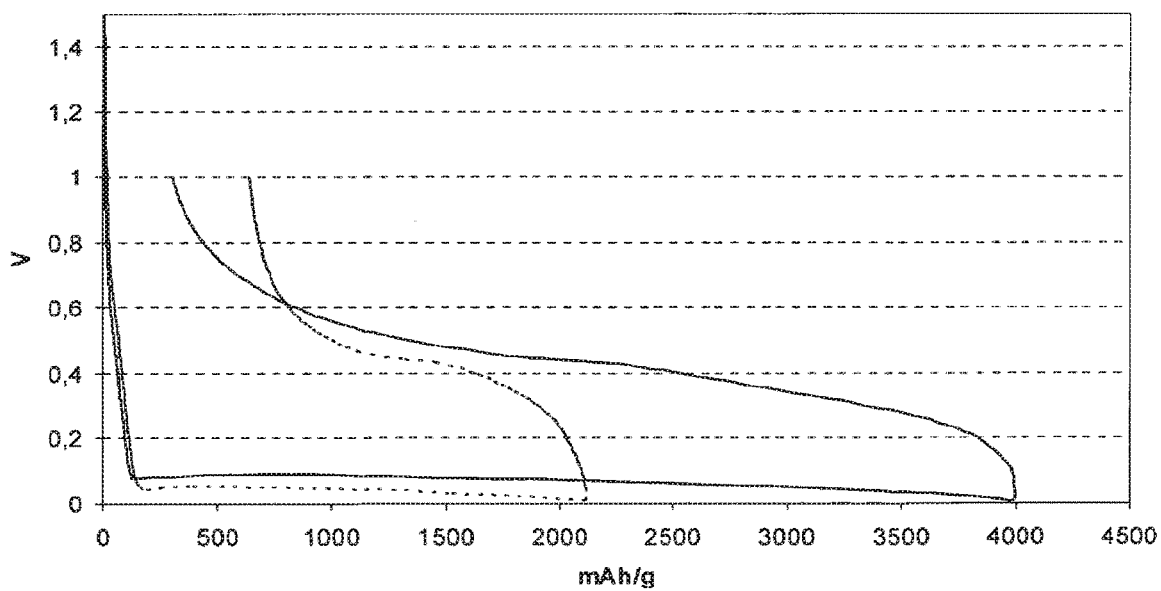
FIG. 2: Delithiation curves for Si powders with oxygen level of 2.8 wt % (full line) and 25.0 wt % (dotted line), Voltage vs. Li (V) against Capacity (mAh/g).

FIG. 2 shows the capacity (mAh/g) of the silicon in the electrodes of the coin cells of Example 1 and Counter example 4 for the first cycle.

Example 5

Figure 3:
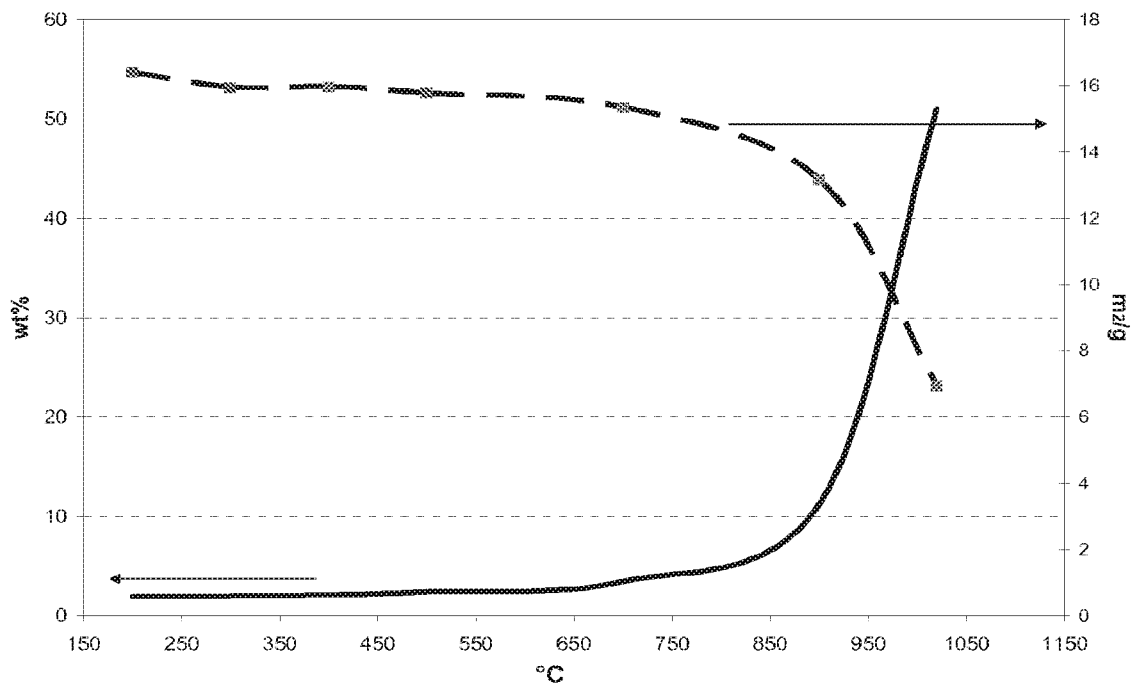
FIG. 3: Oxygen level (in wt %—left axis—full line) and BET value (m²/g—right axis—dotted line) of Si submicron powder as a function of aging temperature (° C.).

The stability of the powder as function of time and temperature is checked in stability experiments. The powder obtained in Example 1 is annealed in air at different temperatures for 1 hour and the oxygen content of the resulting powders is measured by chemical analysis. It is illustrated in FIG. 3 that the oxygen level remains stable in air up to 700° C., after which a drastic increase up to 50 wt % oxygen takes place. In FIG. 3 the oxygen level (full line) is to the left in wt %, whilst the corresponding BET value (in $m^2/g$—dotted line) is shown to the right, both as a function of the temperature in C.

Figure 4:
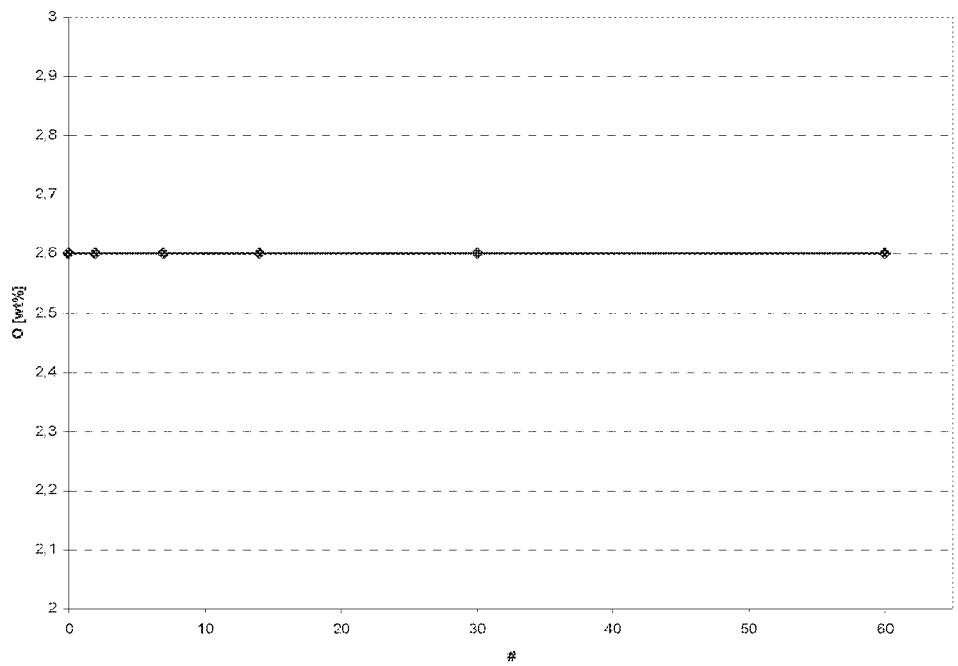
FIG. 4: Oxygen level (in wt %) of Si submicron powder as a function of storage time (in number # of days) in air at room temperature.

At room temperature, no significant increase of the oxygen level as a function of time is observed, as is illustrated in FIG. 4, where the oxygen level (in wt %) is shown against the time in number of days.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

The invention claimed is:

1. A Si powder having an average primary particle size between 20 nm and 200 nm, wherein the powder has a $SiO_x$ surface layer with 0<x<2, the surface layer having an average thickness between 0.5 nm and 10 nm, and wherein the powder has a total oxygen content equal to or less than 3% by weight at room temperature.

2. The Si powder of claim 1, wherein the surface layer has a thickness between 0.5 nm and 5 nm.

3. The Si powder of claim 1, having an oxidized $SiO_x$ surface layer with 1≤x<2.

4. The Si powder of claim 1, having a metallic purity of at least 98 wt % Si.

5. The Si powder of claim 1, having a total oxygen content less than 5% by weight after being aged for 1 hour at 700° C. under atmospheric conditions and in air.

6. The Si powder of claim 1, further comprising an element M selected from the group consisting of transition metals, metalloids, Group Ma elements and carbon.

7. A Li-ion battery comprising the Si powder of claim 1, as a negative electrode material.

8. A powder comprising particles, wherein the particles have an average primary particle size between 20 nm and 200 nm, wherein the particles comprise a silicon core having a surface and a layer at the surface of the silicon core, wherein the layer comprises $SiO_x$ with 0<x<2 and has an average thickness between 0.5 nm and 10 nm, and the powder has a total oxygen content equal to or less than 3% by weight at room temperature.

9. The powder of claim 8, wherein the layer at the surface of the silicon core consists of $SiO_x$ with 0<x<2.

10. The powder of claim 8, wherein the layer at the surface of the silicon core has a thickness between 0.5 nm and 5 nm.

11. The powder of claim 8, wherein the layer at the surface of the silicon core comprises $SiO_x$ with 1≤x<2.

12. The powder of claim 8, having a metallic purity of at least 98 wt % Si.

13. The powder of claim 8, having a total oxygen content less than 5% by weight after being aged for 1 hour at 700° C. under atmospheric conditions and in air.

14. The powder of claim 8, further comprising an element M selected from the group consisting of transition metals, metalloids, Group IIIa elements and carbon.

15. A Li-ion battery comprising the Si powder of claim 8, as a negative electrode material.

\* \* \* \* \*